Figure 9:
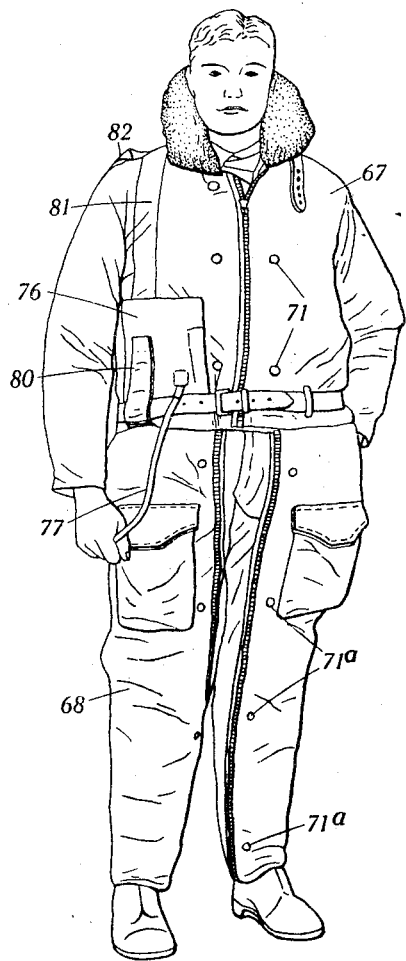

June 30, 1942.  E. H. TAYLOR  2,287,915
ELECTRICALLY HEATED CLOTHING AND EQUIPMENT
Filed Dec. 11, 1940  6 Sheets-Sheet 1
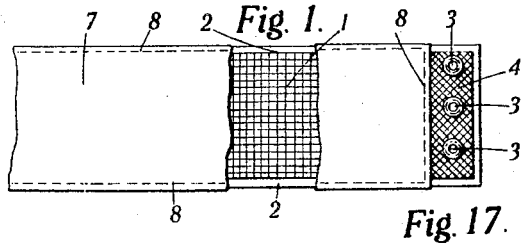
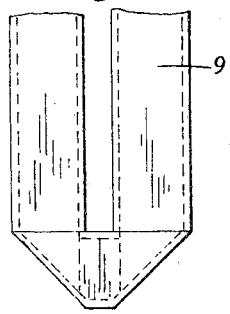
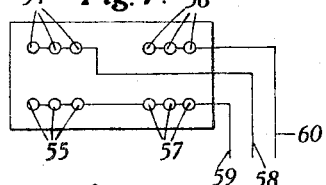
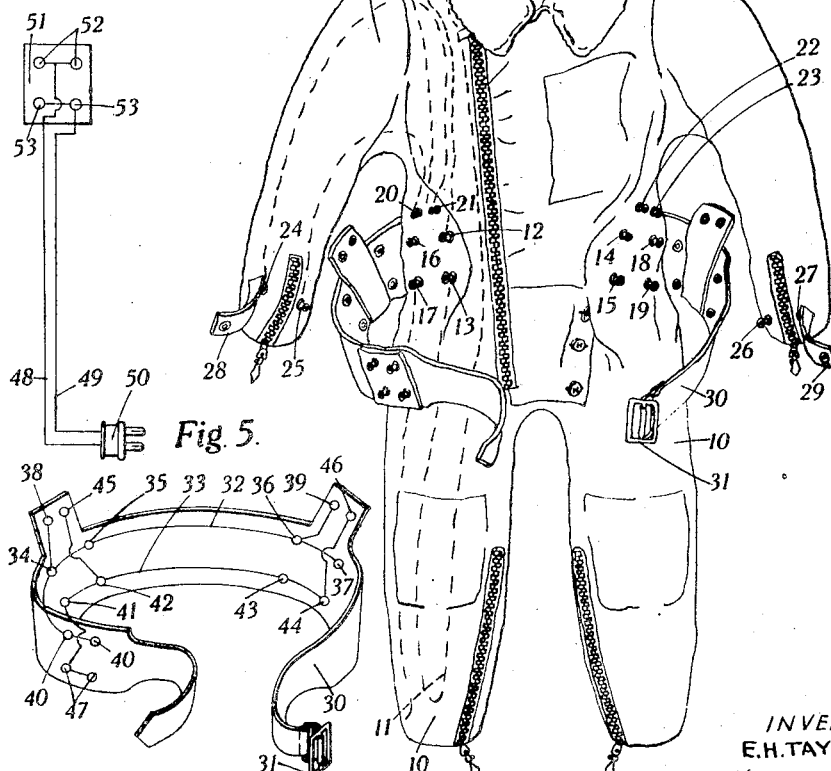
INVENTOR
E.H.TAYLOR
BY
Blair + Kilcoyne
ATTORNEYS

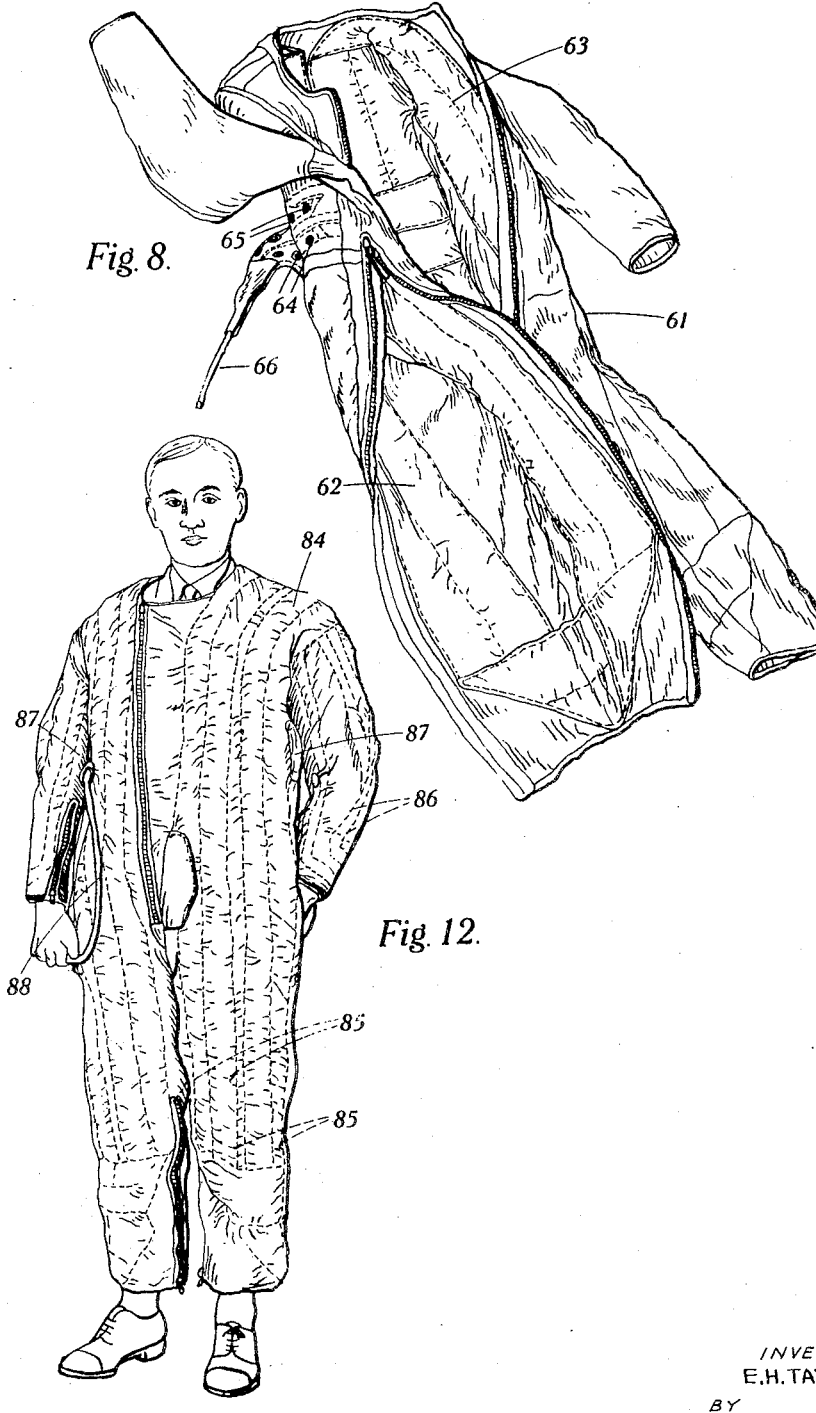

June 30, 1942.  E. H. TAYLOR  2,287,915

ELECTRICALLY HEATED CLOTHING AND EQUIPMENT

Filed Dec. 11, 1940  6 Sheets—Sheet 3

INVENTOR
E. H. TAYLOR
BY
Blair + Kilcoyne
ATTORNEYS

June 30, 1942. E. H. TAYLOR 2,287,915
ELECTRICALLY HEATED CLOTHING AND EQUIPMENT
Filed Dec. 11, 1940 6 Sheets-Sheet 4

INVENTOR
E. H. TAYLOR
ATTORNEYS

June 30, 1942.   E. H. TAYLOR   2,287,915
ELECTRICALLY HEATED CLOTHING AND EQUIPMENT
Filed Dec. 11, 1940   6 Sheets—Sheet 5

INVENTOR
E. H. TAYLOR
BY Blair + Kilcoyne
ATTORNEYS

June 30, 1942.     E. H. TAYLOR     2,287,915
ELECTRICALLY HEATED CLOTHING AND EQUIPMENT
Filed Dec. 11, 1940     6 Sheets-Sheet 6

INVENTOR
E.H. TAYLOR
BY
Blair + Kilcoyne
ATTORNEYS

Patented June 30, 1942

2,287,915

UNITED STATES PATENT OFFICE 2,287,915

ELECTRICALLY HEATED CLOTHING AND EQUIPMENT

Eric Hardman Taylor, Brookside, Combs, England

Application December 11, 1940, Serial No. 369,666
In Great Britain March 4, 1940

13 Claims. (Cl. 219—46)

This invention relates to improvements in electrically heated clothing such as suits, gloves, socks, boots or the like and other equipment such as heater pads, blankets, muffs, coverings or the like.

Electrically heated clothing and equipment are already known, the known method involving the use of electric resistance elements in the form of wires. This known method is open to numerous objections amongst which may be mentioned the small area of heat dissipation pertaining to each element and the resultant necessity for employing high local temperatures if appreciable heating is required and the consequent danger of burning or scorching the article or anything in contact with it. It will also be appreciated that quite apart from these difficulties even the use of high temperature elements does not result in a substantially uniformly heated area but merely in an area which has a number of spaced lines at high temperature.

A further and very serious difficulty encountered in known electrically heated equipment resides in the tendency for the elements to break if they are incorporated in flexible articles and in any event it is difficult to make satisfactory connections with a current supply source because these after relatively short periods of use tend to break away from the wire resistance elements.

One of the objects of the present invention is to provide electrically heated clothing and equipment wherein the above-mentioned difficulties and objections are entirely met and a further object is to provide a very simple, inexpensive and efficient mode of achieving the desired degree of heating.

A further object of the present invention is to provide an electrical resistance heating element comprising gauze, for instance, in strip form, made from conducting material.

A still further object of the present invention is to provide an electrical resistance heating element comprising gauze and connectors in the form of press stud fasteners secured to said gauze and adapted to co-operate with complementary parts secured to other resistance elements or to a current supply source.

Yet another object of the present invention is to provide an article of clothing such as a suit, glove, sock, boot or the like or other electrically heated equipment such as a heater pad, blanket, muff, covering or the like incorporating one or more electrical resistance heating elements comprising strips of gauze made from conducting material.

A still further object of the present invention is to provide an article of clothing such as a suit, glove, sock, boot or the like or other electrically heated equipment such as a heater pad, blanket, muff, covering or the like incorporating electrical resistance heating elements made from wire gauze and press stud fasteners whereby said elements may be detachably interconnected and connected to a current supply source.

With the above and other objects in view which will become apparent from the following specification the present invention resides in the features hereinafter set forth and claimed in the appended claims.

It will be understood that the present invention is applicable to a very wide range of articles such for instance as wearing apparel such as suits, gloves, socks, boots or the like, and heater pads, heater linings, blankets, muffs, coverings or the like and for convenience the expression "electrically heated equipment" as used in the following specification and in the appended claims is intended to cover all of such articles.

It is also to be understood that the term "gauze" as used herein is intended to cover any suitable form of gauze, mesh, net or the like.

I find that very great advantages result from the use of gauze in the production of electrical resistance heating elements and in the use of such elements in electrically heated equipment. Thus such material can be readily cut or formed to any desired shape or dimensions and easily adapted for any desired current supply and wattage dissipation. Moreover, such material is readily adapted for flexing without breakage and even if some of the wires or strands become fractured the efficacy of the element need not become materially impaired owing to the large number of conductors present.

The use of wire gauze also gives a large heating area as opposed to the mere line heating of an ordinary resistance element and it can be stitched, for example with an ordinary sewing machine, into position in clothing or like equipment. This latter feature is of very great importance from the point of view of quick and inexpensive production as the heating system can for instance be incorporated by the actual manufacturer of an article of clothing and with the equipment ordinarily used for the manufacture of such clothing.

According to yet another feature of the present invention I employ electrical connectors in the form of press studs for making connection between the aforesaid gauze heater elements and/or between a gauze heater element and a current supply source. In this way connection and disconnection can be made easily and quickly, and moreover, the fitting of the press stud components to the clothing or equipment concerned is again one which can easily be carried out by the manufacturer of such clothing or equipment.

The aforesaid gauze heater elements can easily be stitched for instance to a fabric base so that they lie flat thereon and I find that there is very little if any tendency for strands of the gauze to cut through the fabric. When employing ordinary resistance wires however, there is a serious tendency for the wires to cut through a fabric base and in any event appreciable bulges are formed where the wires are located.

In cases where gauze heater elements are to be secured together and it is not desired to provide for easy disconnection of such elements then instead of employing the above mentioned press-stud connectors the elements may be directly secured together. Owing to the large areas presented the electrical interconnection of the elements can be easily and quickly secured by directly splicing them together or by folding the ends together and then stitching the overlapped or interlocked parts with any suitable thread or wire.

The aforesaid gauze heater elements may be made of any suitable metal, such for example as stainless steel, nickel-chrome or tinned iron and for the purpose of ensuring good surface contact at the points where connections are made, for instance, with the aforesaid press-studs, a strip of high conductivity material, such as copper gauze may be wrapped around the appropriate part of the heater element or such part of the element may be wrapped around the gauze. In this way any possibility of unduly high local heating is reduced and the assembly is mechanically reinforced at the points of connection.

The aforesaid gauze heater element may be made of any desired mesh and from wire of any desired size. In many cases, however, wire of 43 S. W. G. made into a mesh of 60 x 50 wires per square inch is suitable.

In cases where it is desired permanently to connect current supply leads to a heater element then in place of employing connectors in the form of press-studs use may be made of rivets, for instance, resembling bifurcated paper fasteners, the heads of such rivets being relatively large so that they make large areas of contact with the gauze.

Heater elements according to the present invention can be disposed over substantially the whole area of an article to be heated and at the same time the wattage distribution can be designed for any desired value. Thus, a given area can be covered with only very small intervening spaces between the elements either by using a relatively short length of wide gauze or a relatively long length of narrow gauze, the former arrangement dissipating a relatively high wattage and the latter a relatively low one. The elements can, of course, be zig-zagged over any desired area in order to accommodate the desired lengths of elements and the flexible nature of such elements permits of their being easily folded into this disposition.

The heater elements employed in carrying out the present invention are preferably enclosed in cloth channels or the like as this facilitates handling of the elements and also prevents local short circuits which might otherwise arise when the device is folded.

When employing press-stud connectors in carrying out the present invention, it is preferable to employ a plurality of studs for each connection so as to reduce the possibility of inadvertent disconnection and the possibility of local heating such as may occasionally arise from bad connection at any particular press-stud. In some cases it is desirable to employ sufficient press-studs to ensure that each stud is only called upon to pass a current not exceeding 1½ to 2 amperes.

Heating means according to the present invention may be applied to various articles such as foot muffs, camera muffs and the like and they are particularly applicable to articles of clothing such as aviators' suits, gloves, socks, boots and the like.

Figure 13:
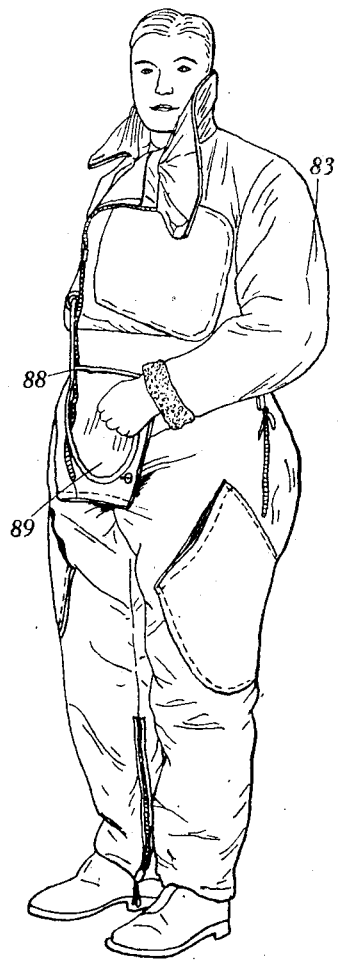
Figure 10:
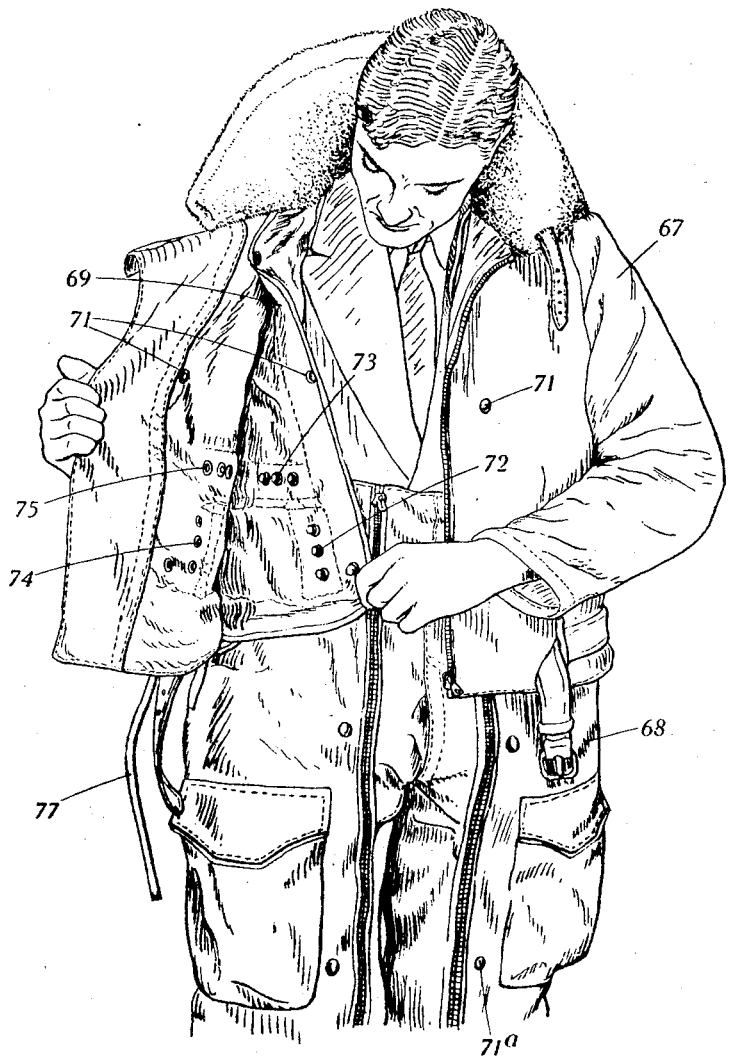
Figure 11:
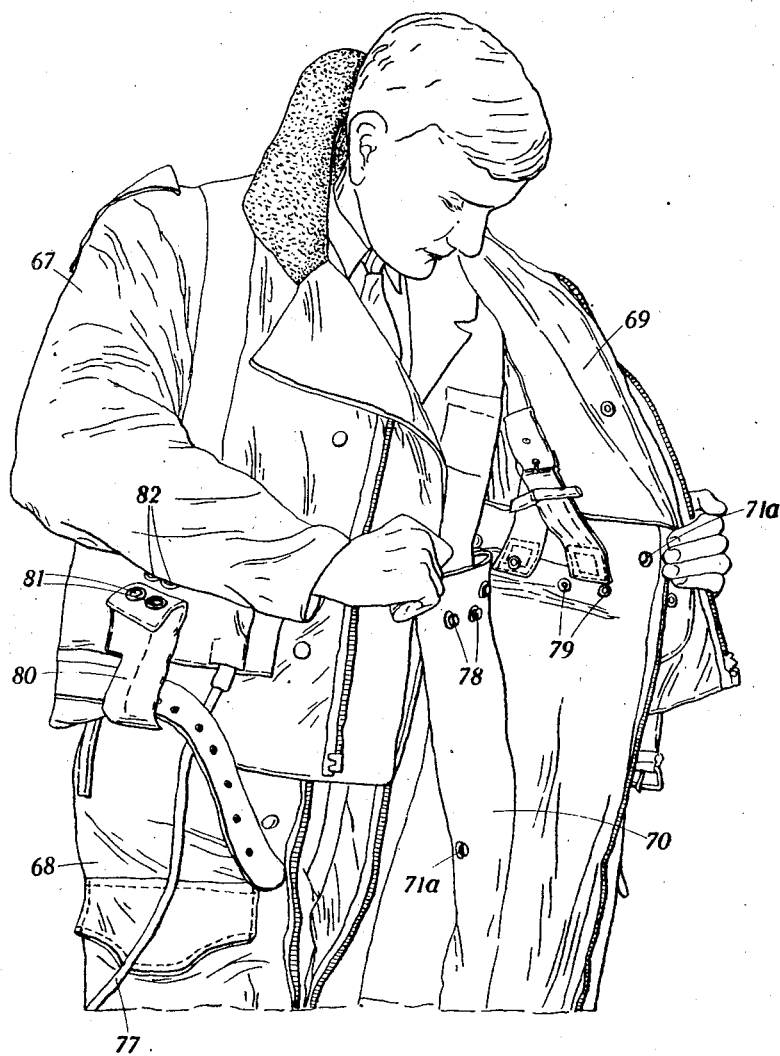
Figure 14:
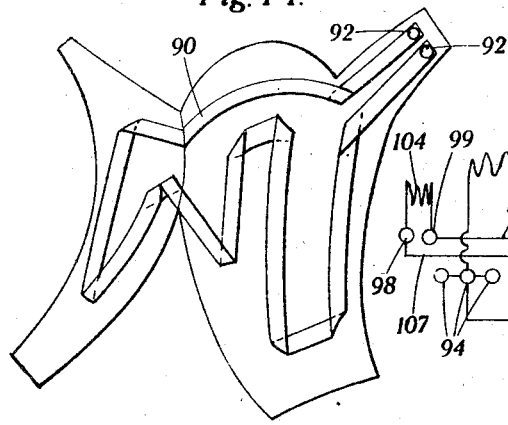
Figure 16:
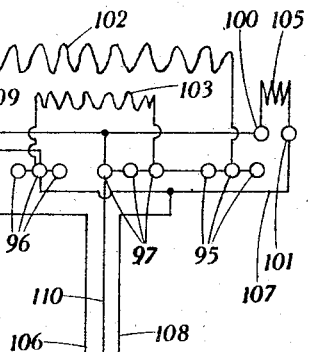
Figure 15:
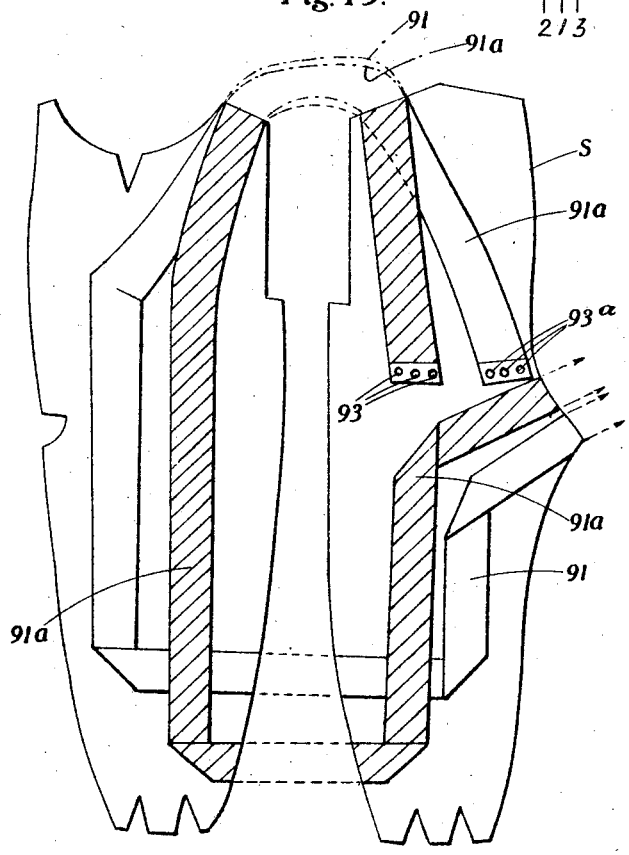

In order that the present invention may be well understood some embodiments of heater elements and of their application to specific articles will now be described by way of examples and with reference to the accompanying drawings in which:

Figure 1 shows in broken plan view one form of element fitted with press-stud connectors and enclosed within a cloth channel, Figure 2 is a side elevation of Figure 1, Figure 3 shows how an element may be folded to assume a zig-zag disposition, Figure 4 shows in front elevation one form of aviator's suit incorporating heating means according to the present invention, Figure 5 is a detail view of the belt employed in the equipment shown in Figure 4, Figure 6 is a detail view of an external connector for use with the equipment shown in Figures 4 and 5, Figure 7 is a wiring diagram showing one mode of varying the degree of heating afforded and/or of enabling heating currents of two different voltages to be employed, Figure 8 shows one mode of applying the invention to an under garment or lining for use with a flying suit, Figure 9 shows the application of the invention to a suit consisting of separate trouser and jacket parts, Figures 10 and 11 are views of parts of the equipment shown in Figure 9 but with parts undone to expose other parts, Figure 12 shows another form of lining incorporating the present invention, Figure 13 shows a suit for use in conjunction with the lining shown in Figure 12, Figure 14 is a detail view showing how the heater elements may be attached to the arms of the garment shown in Figure 12, Figure 15 is a detail view showing how the heater elements may be attached to the legs of the garment shown in Figure 12, Figure 16 is a wiring diagram showing a circuit arrangement for incorporation in a belt and making provision for varying the heating afforded by the resistance elements, and Figures 17 and 18 show one form of plug and socket connector suitable for use with a belt wired in accordance with the circuit shown in Figure 16.

Referring to Figures 1 and 2 of the drawings, the element consists of a strip of gauze 1 made for example from 43 S. W. G. stainless steel wire with 60 x 50 wires per square inch. The longitudinal edges of the gauze are bound with fabric 2, which might for instance consist of adhesive tape.

The end or ends of the gauze 1 with which it is desired to make electrical connection is or are provided with press-stud connectors as shown at the right hand side of Figures 1 and 2 where three studs 3, 3, 3 are shown. In order to ensure good contact between said studs and the gauze 1 a strip of copper gauze 4 is superimposed on or interleaved in the stainless steel gauze and the two are folded so as to form two or more interlocked plies. The base parts of the studs 3, 3, 3 are then passed through holes in the folded gauze and the upper parts are secured thereto, said lower parts having relatively large base flanges 5 so as to afford good electrical contact and the complementary parts having flanges 6 for firmly gripping the assembly.

The gauze strip 1 may be encased within a fabric covering 7, which covering facilitates the handling of the element and prevents any short-circuiting due to folding. In cases where such covering is employed the upper ends of the studs 3 are of course exposed.

The aforesaid covering 7 may be secured by rows of stitching 8 and any such stitching operation can be carried out in an ordinary sewing machine.

The completed element may be secured to any desired article by a stitching operation which can also be carried out on any ordinary sewing machine and in order to cover any particular area the element may be zig-zagged over such area in any convenient way.

The aforesaid press-studs 3, 3, 3 of course co-operate with complementary socket portions and in cases where these are carried by a further heater element they may be secured to the gauze in a manner identical with that described with reference to the studs.

Figure 3 of the accompanying drawings shows how an element 9 may be bent into zig-zag formation. In this figure the element is bent over upon itself through ninety degrees and then at a closely spaced point it is bent under the lateral portion again through ninety degrees so that two parallel runs are formed. Obviously by bending the element through other angles the various runs may be disposed in any desired angular arrangement and/or the element can be rucked to form a curve or follow any desired line.

Referring to Figure 4 of the drawings an aviator's suit 10 is provided with gauze heaters extending over the front and back of the garment and over the sleeves. In this embodiment one heater element is zig-zagged over the right hand front part of the garment including the front of the legs, this element being diagrammatically indicated in dotted lines 11, and the respective ends are provided with press-studs 12, 13 in the manner already described. A similar element extends over the left hand fore part of the garment and the ends are provided with press-studs 14, 15.

Gauze strips are similarly zig-zagged over each half portion of the back of the garment including the rear parts of the legs, these strips being provided with terminal studs 16 and 17, and 18 and 19 respectively.

The sleeves of the garment shown in Figure 4 are provided with elements whose continuity can be interrupted or completed at the cuff portions. Studs 20, 21 and 22, 23 are provided at the inner ends of the arm heating elements and the outer ends, i. e. the parts adjacent to the cuffs of the sleeves, are provided with press-studs 24, 25 and 26, 27, respectively. These pairs of studs can be coupled or uncoupled at will by straps 28, 29 carrying sockets and adapted to co-operate with said studs and preferably interconnected by gauze strips similar to those employed for the aforesaid heater elements.

By connecting or disconnecting the bridge straps 28, 29 the heating circuit of the sleeves can be closed or opened at will and by providing the external contacts 24, 25, 26, 27 provision is made for easily coupling up electrically heated gloves, the circuit through the gloves then completing the circuit through the sleeves.

If desired provision similar to that made at the cuff portions of the sleeves may be made at the ankle portions of the legs for enabling electrically heated boots, slippers, socks or the like to be connected in circuit.

The gauze strips employed in the sleeves of the above described suit may be of tinned iron of 42 S. W. G., and of 80 x 80 mesh per square inch in which case such gauze may be in strip form about ½" wide and there may be about 21½ feet in each sleeve whilst each front part of the suit may have about 23 feet of similar gauze ⅞ inch wide, and each rear part may have 33 feet of similar gauze ⅞" wide, the total wattage dissipation on a twelve volt supply being about 211 watts, i. e. 66 on the front of the suit, 79 on the back and 66 on the sleeves.

The suit shown in Figure 4 includes a belt 30 the ends of which can be releasably interconnected by means of a buckle 31. Strips of wire gauze extend through the belt 30 and these strips are connected to sockets forming complementary parts of the above-mentioned press studs on the suit and to press studs for connection to a current supply source. Figure 5 shows in detail the circuit arrangement of the belt and in this figure single lines are employed for denoting the various gauze strips. There are two main gauze strips 32, 33 extending around the belt, the upper strip being electrically connected to press sockets 34 and 35 for connection with the studs 12 and 16, press sockets 36 and 37 for connection to the studs 18 and 14, a press socket 38 for connection with the stud 21, a press socket 39 for connection with the stud 23, and a pair of studs 40, 40 for connection to external supply leads. The lower strip 33 is electrically connected to press sockets 41 and 42 for connection with the studs 13 and 17, press sockets 43 and 44 for connection with the studs 19 and 15, a press socket 45 for connection with the stud 20, a press socket 46 for connection with the stud 22, and a pair of studs 47, 47, for connection to external supply leads.

Figure 6 shows a suitable form of supply connector which includes two flexible leads 48, 49 having a plug 50 at one end for connection to a supply source, for example an accumulator or the like, and a fabric panel 51 at the other end. Said panel 51 has two pairs of sockets 52, 52 and 53, 53 positioned for engagement with the studs 40, 40, and 47, 47 respectively, the sockets 52, 52 being interconnected by a gauze strip and the studs 53, 53 being similarly interconnected.

When the belt 10 is fitted to the suit and the leads 48, 49 are connected to the belt and to a current source current will flow through the two gauze resistance elements on the front of the suit and through the two elements on the back, said four elements being in shunt. If the cuff straps, 28, 29 are connected or if gloves are connected across the cuff studs current will also flow through the arm heaters which are also in shunt with the other heating circuits.

Figure 7 shows diagrammatically a wiring diagram for the above described belt wherein provision is made for varying the heat generated from a fixed current source say a twelve volt source or for enabling the suit to be heated from supplies at two different voltages, say twelve volt and twenty four volts. In this arrangement the group of sockets 54 will be assumed to be for connection to the studs connected to the upper ends of the body and arm heating elements located at one side of the suit, the sockets 55 for connection to the lower ends of said elements, the sockets 56 for connection to the upper ends of the body and arm heating elements located at the other side of the suit and the sockets 57 for connection to the lower ends of the last mentioned elements. The group of sockets 54 is connected to a lead 58, the groups of sockets 55 and 57 are connected to a lead 59 and the group of sockets 56 is connected to a lead 60. If lead 59 is connected to one pole of a supply source and leads 58 and 60 are connected to the other pole then the two heating circuits are in parallel and there will be maximum heating. If, however, lead 59 is disconnected and the leads 58 and 60 are connected to the respective poles of the supply source then the two heating circuits will be in series and there will be less heating. This possibility of varying the manner in which the various heating circuits are interconnected also enables different supply voltages to be employed. Thus, for instance, the elements may be so designed that a similar heating effect is attained when the heating elements are connected in parallel to a twelve volt supply as when said elements are connected in series to a twenty-four volt supply.

In the event of its being necessary to extend one strip of gauze by joining another thereto the joining can be easily effected by a splicing operation. Thus, for instance, the ends to be joined may be overlapped to a distance equal say to twice the width of the strip and each end may be encased in a Z-shaped piece of copper gauze, the superimposed assembly being secured for instance by rectangular and diagonal stitching in a sewing machine.

Referring to Figure 8, 61 denotes the lining garment of a known form of flying suit and to this garment there are fitted two heating elements 62, 63. The element 62 extends from press studs 64, 64 down the back of the garment around the ankle then up the front of the garment over the shoulder and back to studs 65, 65. The element 63 similarly extends on the other side of the garment from similarly disposed studs. The supply conductor unit 66 which may include a belt, has press sockets for engagement with the groups of press studs, some of such sockets being shown at the left hand side of Figure 8. If desired sleeve heating elements may also be provided and connections similar to those described with reference to Figure 4 may then be employed. If desired the belt may be wired as indicated in Figure 7 in order to provide for two degrees of heating.

Referring to Figures 9 to 11, the flying suit is in two parts, namely, a jacket portion 67 and a trousers portion 68. In this embodiment the jacket 67 is provided with detachable heater pads 69 and the trousers 68 are provided with detachable heater pads 70, said pads preferably conforming with the general contour of the parts of the garment for which they are intended. These pads are preferably secured to the garment by press fasteners some of the fasteners for the jacket being designated 71 and some of those for the trousers being designated 71a.

The aforesaid heater pads are provided with gauze elements similar to those hereinbefore described and press studs are employed for making electrical connection therewith. In Figure 10 groups of studs 72 and 73 are exposed these being the studs connected to the ends of the heater elements for the left hand side of the jacket as viewed in the figure. Complementary groups of press sockets 74 and 75 are provided in the jacket and studs extend from these sockets on to the outside of the jacket where a panel 76 (Figure 9) is fitted, said panel having sockets connected to a supply cable 77. Figure 11 shows some of the studs 78 in electrical connection with the trouser elements and these make connection with sockets 79 which are in electrical connection with gauze elements passing round the waist to the other side of the trousers and along a strap-like part 80, this part 80 being provided with sockets 81 for connection with studs 82 extending from the gauze in the panel 76. In this way current is supplied to the elements in the pads fitted to the trousers.

If it is desired to provide heating of the sleeve portions of the suit shown in Figure 9, current supply elements of copper gauze or other suitable material may extend from the press stud fasteners associated with the jacket heating elements to studs at the shoulder portions and connection with heater elements in the sleeves or in linings therefore may then be made by shoulder straps. Thus in Figure 9, the position of a current conductor element can be seen at 81 at the left hand side of the figure and a shoulder strap 82 for making electrical connection with the sleeve element can also be seen. A similar shoulder strap would of course also be included at the other side of the suit and may be fed with current by a continuation of the conductor 81, the respective sleeve circuits being arranged in parallel with the heating circuits of the body portion of the jacket.

Figures 12 and 13 show another form of flying equipment comprising an outer suit 83 and a separate inner suit 84, the outer suit being worn either with or without the inner one as may be desired. The inner suit 84 is provided with gauze heater elements in accordance with the present invention. The paths of the two body and leg elements can be seen from the lines of stitching some of which are designated 85 and the paths of the sleeve heating elements can also be seen from the lines of stitching some of which are designated 86.

The various heater elements are in electrical connection with press studs and current is supplied to these through complementary sockets fitted to a belt 87, said sockets also being connected to a supply cable 88, provided with any suitable plug for connection to an accumulator or other source of current supply.

Figure 14 shows how the sleeve heater elements may be arranged on the sleeves of the garment shown in Figure 12. One element 90 is fitted to each sleeve and the ends thereof are connected to press studs 92, 92, the sleeves being cut with what is known in the trade as an under arm pivot so that they reach to the belt line and so permit of said studs making engagement with contact sockets on the belt 87 (Figure 12).

Figure 15 shows how the two body and leg heating elements may be fitted to the garment 84 (Figure 12), the elements being designated 91 and 91a and terminating in groups of plugs 93, 93a for connection with complementary sockets on the belt 87. The line S denotes the back seam of the garment and it will be appreciated that such garment will comprise two sets of the sections shown in Figure 15.

The belt wiring shown diagrammatically in Figure 16 may be employed on the garment shown in Figure 12 and provides for various degrees of heating and for the use of supplies at various voltages. In this figure the sockets 94 are those for connection to the studs 93a extending from one end of the heating element 91a (Figure 15), the sockets 95 are those for connection to the studs at the other end of such element, the sockets 96 are those for connection to the studs 93 (Figure 15) at one end of the heating elements 91 (Figure 15), the sockets 97 are those for connection to the studs at the other end of said last mentioned element and the two pairs of sockets 98, 99 and 100, 101 are those for connection to the studs at the ends of the respective sleeve heating elements. The two body and leg heating elements are diagrammatically represented by resistances 102, 103 and the two sleeve heating elements are diagrammatically represented by resistances 104, 105.

The contacts 94 are connected to the lead 106 of a three wire cable, the contacts 98, 96 and 101 are interconnected with one another by a wire 107 and the latter is connected to the lead 108 of the supply cable, and the sockets 99 and 100 are interconnected by a wire 109 which is in turn connected to the lead 110 of the cable and to said lead are also connected the sockets 95 and 97.

On a twelve volt supply the above circuit provides for three degrees of heating. Thus lead 110 may be connected to the negative pole and leads 106 and 108 may be connected to the positive pole so putting the resistances 102, 103, 104 and 105 in shunt and providing for maximum heating. In order to provide medium heating lead 106 may be entirely disconnected so cutting out the resistance 102, and in order to provide low heating leads 106 and 110 may be connected to the respective poles, lead 108 remaining disconnected and so cutting out resistances 103, 104 and 105. In the case where the suit is heated from a twenty four volt supply high heating may be attained by connecting leads 106 and 108 to the supply poles the arms being rewired so that their heater elements are in series and lower heat may be attained by cutting out the arm heating elements. The system provides therefor for operation on two different voltages, e. g. twelve volt and twenty four volt and for three degrees of heating on the lower voltage and for two degrees of heating on the upper one.

The adaptor plug fitted to the above mentioned three wire cable and the socket for co-operation therewith may be so designed that the particular degree of heating attained can be determined by the relative positions of the plug and socket.

Figure 17 shows one suitable form of plug and Figure 18 shows one form of complementary socket which may, for instance be fitted to an accumulator. The plug 111 is provided with four legs 112, 113, 114 and 115, the leg 112 being connected to the lead 110, the leg 113 to the lead 106, the leg 115 to the lead 108 and the leg 114 being a dummy one. The socket unit 111a has a socket 116 connected to one pole of the accumulator, sockets 117 and 118 bridged by a conductor 119 and connected to the other pole of the accumulator, and a dummy socket 120. The plug can therefore be inserted in a position in which the lead 110 is connected say to the negative pole and leads 106 and 108 to the other pole or either of the leads 110, 106 or 108 can be connected to socket 120, i. e. put out of circuit.

Whilst I have hereinbefore described some embodiments of the present invention it is to be understood that there may be various modifications without departing from the scope of such invention. Thus, for instance, the heater elements may be of any desired length or width and they may be made from wire of any desired gauge. It is further to be understood that heater elements in accordance with the present invention may be applied to or be embodied in various forms of clothing such as suits, gloves, boots, socks or the like or in other equipment such as heater pads, blankets, muffs, coverings or the like in addition to those specifically mentioned herein.

I claim:

1. An electrical resistance heating element comprising a strip of wire gauze covered with flexible fabric and having press-stud connectors secured to said gauze for enabling electrical connection to be made therewith.

2. An electrical resistance heating element comprising a strip of gauze incorporating stainless steel wire covered with flexible fabric and having press-stud connectors secured to said gauze for enabling electrical connection to be made therewith.

3. An electrical resistance heating element comprising a strip of wire gauze covered with flexible fabric and having press-stud connectors secured to said gauze for enabling electrical connection to be made therewith, said gauze having a mesh of 60 x 50 wires per inch of surface area.

4. An electrical resistance element as claimed in claim 2 including strips of gauze made of low resistance material such as copper located between said press-stud connectors and said stainless steel gauze so as to improve the electrical connection between the latter and said connectors.

5. Electrically heated clothing incorporating at least one electrical resistance element consisting of a strip of gauze incorporating stainless steel wires.

6. Electrically heated clothing incorporating at least one electrical resistance element consisting of a strip of gauze with press stud connectors passing therethrough for enabling electrical connection to be made therewith.

7. Electrically heated clothing incorporating a plurality of electrical resistance elements consisting of strips of gauze some of which have press-stud connectors fitted thereto for enabling electrical connection to be made therewith.

8. An electrically heated suit incorporating electrical resistance elements consisting of strips of wire gauze the ends of such strips being located adjacent to the waist line of the suit and being provided with press-stud connectors for enabling connection to be made with current supply leads.

9. An electrically heated suit as claimed in claim 8 including a belt pad, current supply leads incorporated in said belt pad and press stud connectors on said belt pad and connected to said leads, said connectors being adapted to cooperate with the press-studs carried by the suit.

10. An electrically heated suit having limb and trunk portions, electrical resistance elements consisting of strips of wire gauze incorporated in said limb and trunk portions, press stud connectors fitted to said resistance elements, and releasable connectors incorporating complementary press stud connectors for putting said limb elements into and out of circuit independently of the trunk elements.

11. An electrically heated suit having separate trousers and jacket portions, electric resistance elements consisting of strips of wire gauze incorporated in said trousers and in said jacket and a strap into which the heating system of one portion of said suit is extended, said strap being provided with connectors for making detachable connection with the heating system of the other portion of said suit.

12. An electrically heated suit having a detachable lining, heater elements consisting of strips of wire gauze incorporated in said lining, and press-stud connectors for enabling said lining to be detachably attached to said suit, some of said press stud connectors being in electrical connection with said heater elements and serving for making electrical connection between said elements and current supply means.

13. An electrically heated suit according to claim 12 wherein said gauze strips are made from stainless steel wire and strips of gauze made of copper are located between said strips of stainless steel and said press-stud connectors forming part of the electrical circuit so as to ensure good electrical connection between said connectors and said stainless steel gauze strips.

ERIC HARDMAN TAYLOR.